T. L. RANKIN.
Apparatus for Producing and Maintaining the Ice-Floor of a Skating-Rink.

No. 220,421. Patented Oct. 7, 1879.

WITNESSES:
Henry N. Miller
C. Sedgwick

INVENTOR:
T. L. Rankin
BY Munn & Co
ATTORNEYS.

UNITED STATES PATENT OFFICE.

THOMAS L. RANKIN, OF LYNDON, KANSAS.

IMPROVEMENT IN APPARATUS FOR PRODUCING AND MAINTAINING THE ICE-FLOOR OF A SKATING-RINK.

Specification forming part of Letters Patent No. 220,421, dated October 7, 1879; application filed March 8, 1879.

*To all whom it may concern:*

Be it known that I, THOMAS L. RANKIN, of Lyndon, in the county of Osage and State of Kansas, have invented a new and Improved Apparatus for Producing and Maintaining the Ice-Floor of a Skating-Rink, of which the following is a specification.

Figure 1:
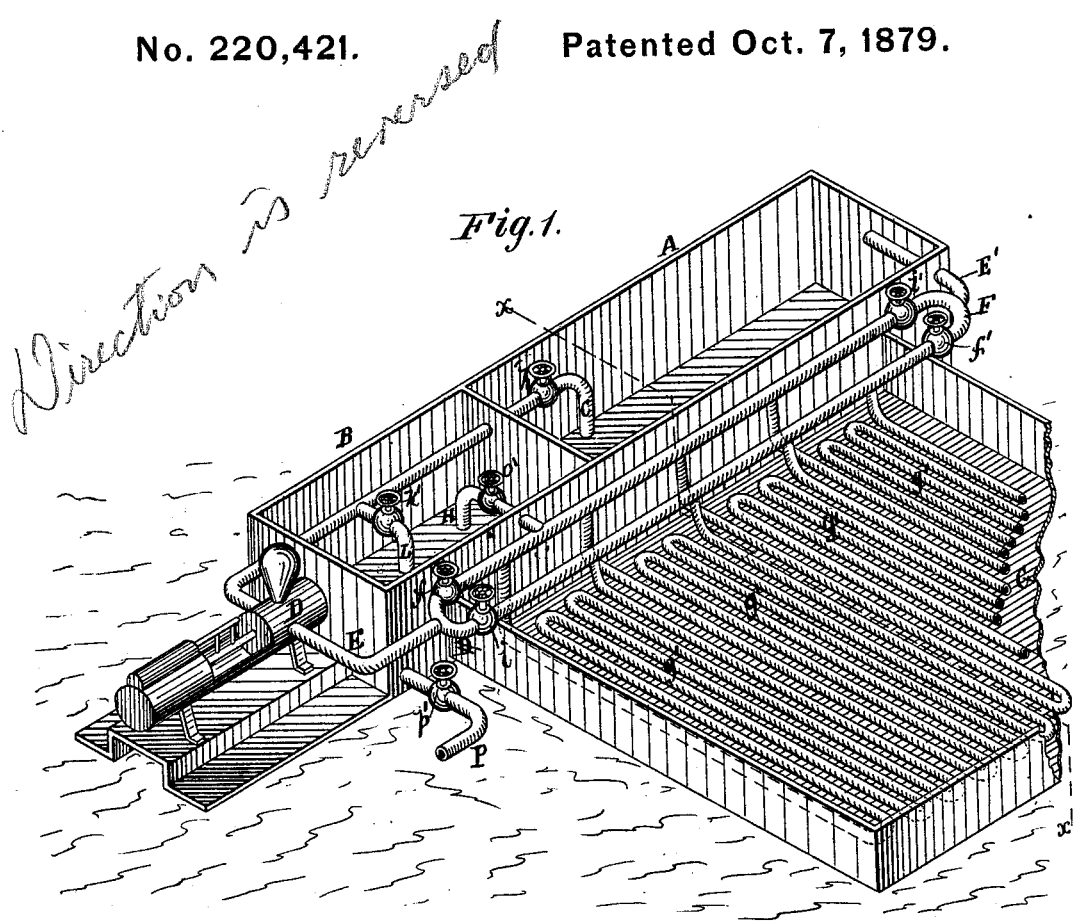
Figure 2:
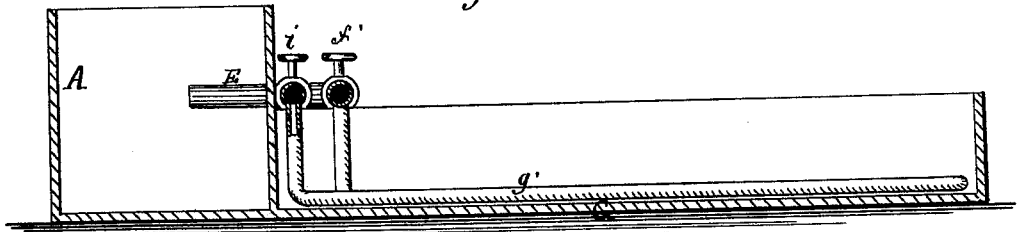

Figure 1 is a plan, in perspective, of the rink. Fig. 2 is a section on line $x\, x$.

Similar letters of reference indicate corresponding parts.

The object of this invention is to construct and maintain a skating-rink by novel arrangement and construction of the parts, so as to secure a more effective circulation of the refrigerating-mixture.

The invention consists in the apparatus consisting of tanks, pump, pipes with cocks, and pipe-sections, as hereinafter more particularly described.

The apparatus for employing the mixture of ice, salt, and water consists of the tank A, into which these ingredients are placed. B is an adjoining tank, the use of which will be hereinafter explained. From within that end of the tank A which is nearest to B the pipe C extends through the partition between them, and through the tank B to the pump D. From the other side of the pump the pipe E extends around the end of the tank B and unites with the bend of the double pipe F, that extends along the whole length of the two tanks and parallel with them. Near the extreme end of the tank A the other bend of the pipe F unites with the pipe E', that turns and enters the tank A at or near that point.

Laid upon the floor G of the rink, and extending across it at right angles from the main pipe F, are the branch circulating pipes bent back and forth in parallel lines and nearly in close contact with each other. These pipes are laid in sections $g'\, g'$, that measure about two feet (more or less) across, and one end of each section is connected with one of the branches of the main pipe, while the other end of each is connected with the other branch. Ordinarily about four inches of water to be converted into ice is put over these small pipes, and retained there by the edge or rim surrounding the floor. Then into the tank A are placed water, ice, and salt in proportions and quantities sufficient for beginning the freezing process, and as the work goes on these proportions and quantities are varied according to the extent of ice-surface to be made, the time that can be given to accomplish it, and the temperature of the surrounding atmosphere. The cocks $f, f,'$ and $h'$ are then opened, all the others remaining closed, and the pump being set in motion the refrigerating-mixture is drawn from one end of the tank A through the pipe C, and forced through the pipe E into the inner branch of the pipe F, and successively through each pipe-section on the floor of rink until finally it enters the pipe E', and is discharged into the other end of the tank A.

After the refrigerating-liquid has circulated for a time in this direction it is found of advantage, in order to equalize the temperature at every point upon the floor of the rink, to close the cocks $f f'$ and open the cocks $i\, i'$, so that the direction of the current through the pipe-sections $g'\, g'$ may be reversed, and in order also to prevent the possible clogging of the sections by any accidental impurities in the mixture. When, however, there is fear of danger from such impurities a filter put about the mouth of the pipe C will effectually remove it. It will be seen, then, that a constant current flows from one end to the other of the tank A, and that at each return the liquid must become reduced in temperature from the added ice and salt. When, in time, from these added ingredients the supply of liquid becomes excessive the cocks $f, f'$, and $i'$ are closed, and $i$ and $o'$ are opened. Then the liquid is made to circulate through the pipe-sections, and return and empty into the tank B through the pipe H until it is full. Then the cock $h'$ is closed, and $k'$ of the pipe L is opened, and the liquid is taken from and returned to the tank B until its temperature is increased by circulating through the sections to nearly a non-effective temperature. Then the cock $p'$ is opened and the waste liquid permitted to flow off through pipe P, and by regulating the cocks the circulation is again resumed through the tank A, the liquid in which has been decreasing in temperature while the tank B has been used.

It is well known that when salt and ice are mixed the salt causes the ice to melt by reason of its attraction for water, and the water formed dissolves the salt, so that both pass from the solid to the liquid condition, and a large quantity of heat is absorbed and becomes latent. This heat being derived from that which previously existed in the solids themselves in a sensible state causes the temperature necessarily to fall.

A mixture of salt and ice can generate a degree of cold about 30° below the temperature of freezing water.

If a pound of water at 172° be added to a pound of ice at 32°, the ice will quickly dissolve, and a thermometer placed in the mixture will stand at 32°, or if a pound of water at 32° be mixed with a pound at 172° the mixture will be 102°. Hence it has been observed that the pound of hot water which was originally at 172° actually loses 140° of heat, all of which enters into the ice and causes its liquefaction, but does not affect its temperature. Hence it follows that a quantity of heat becomes insensible during the melting of the ice, sufficient to raise the temperature of an equal weight of water 140°. It is this property of the mixture of salt and ice of which advantage is taken for freezing the water lying above and about the pipe-sections on the floor of the rink, and to this mixture water is added to hasten the solution of the salt, and the melting of the ice mixed with it.

The constant circulation of this intensely refrigerating mixture or liquid through the sections $g'$ $g'$ so abstracts the heat from the water around them that a solid sheet of ice of unusual hardness is quickly formed and easily maintained, though the surrounding atmosphere may be at a temperature of 70° Fahrenheit, or thereabout; and it is found that a single pump is sufficient to induce the necessary circulation for this purpose through any desired length of pipe.

Having thus fully described my invention, I claim as new and desire to secure by Letters Patent—

An apparatus for the production and maintenance of a floor of ice in a skating-rink, consisting of tanks A and B, pump D, pipes C, E, E', F, H, L, and P, with their respective cocks, and pipe-sections $g'$ $g'$, substantially as herein shown and described.

THOMAS L. RANKIN.

Witnesses:
C. SEDGWICK,
I. I. STORER.